(12) United States Patent
Joseph

(10) Patent No.: US 6,689,470 B1
(45) Date of Patent: Feb. 10, 2004

(54) THERMAL PROTECTION SYSTEM

(75) Inventor: Brian E. Joseph, Wheeling, WV (US)

(73) Assignee: Touchstone Research Laboratory, Ltd., Triadelphia, WV (US)

( * ) Notice: Subject to any disclaimer, the term of this patent is extended or adjusted under 35 U.S.C. 154(b) by 0 days.

(21) Appl. No.: 09/944,273

(22) Filed: Aug. 31, 2001

Related U.S. Application Data

(63) Continuation-in-part of application No. 09/733,566, filed on Dec. 8, 2000, now Pat. No. 6,455,804.

(51) Int. Cl.[7] ............................................... B32B 9/00
(52) U.S. Cl. .................. 428/408; 428/212; 428/634; 428/920
(58) Field of Search ................... 428/634, 654, 428/408, 212, 920; 244/121

(56) References Cited

U.S. PATENT DOCUMENTS 5,154,373 A * 10/1992 Scott ...................... 244/117 R

* cited by examiner

Primary Examiner—Deborah Jones
Assistant Examiner—Abraham Bahta
(74) Attorney, Agent, or Firm—McGuire Woods LLP

(57) ABSTRACT

A thermal protection system (TPS) that combines a structural thermal insulator (carbon foam) with a high specific strength metal matrix composite. According to a specifically preferred embodiment, the structural thermal insulator is overcoated with a protective antioxidant layer or incorporates an antioxidant compound therein.

27 Claims, 4 Drawing Sheets

THERMAL PROTECTION SYSTEM

This application is a continuation-in-part of U.S. patent application Ser. No. 09/733,566 filed Dec. 8, 2000 and entitled "Continuous Metal Matrix Composite Consolidation" now U.S. Pat. No. 6,455,804.

FIELD OF THE INVENTION

The present invention relates to enhanced thermal protection systems for applications that demand high strength and high temperature protection such as in spacecraft, and more particularly to multi-layer thermal protection systems that utilize carbonaceous foam as the insulating material and consolidated metal matrix materials as the provider of strength.

BACKGROUND OF THE INVENTION

The design of improved thermal protection systems particularly for spacecraft has been a long and demanding one. Historically, there have been two approaches in the design of such systems. Either the thermal protection system (TPS hereinafter) has offered little structural benefit and simply served to transfer loads to an underlying, primary "cold structure" often fabricated from, for example, a graphite-reinforced polymer material, or the structural and thermal properties of a single element system have been compromised to allow the structure to withstand elevated temperatures.

Such demands are probably no more apparent than in the requirements imposed by NASA in the development of materials systems and design approaches to support the development of integral cryogenic tank structures and thermal protection systems such as those required by reusable launch vehicles such as the X-33. These types of spacecraft experience lengthy reentry profiles and are thus exposed to high total heat input while also being exposed to relatively extreme structural demands imposed upon the "airframe" during launch and reentry.

In the design of such vehicles, among the long list of concerns are: 1) weight; 2) cost; 3) oxidation resistance of the TPS; 4) waterproofing; and 5) structural efficiency. There are number of currently proposed systems to meet the stingent requirements in each of these areas. One such proposed system utilizes a ceramic-infiltrated woven fiber preform that offers excellent oxidation resistance and thermal protection however, at the expense of strength and weight. To improve the performance of such materials it has been proposed to use such composites as an exterior layer backed up by a primary load bearing structure. A similar, but light weight, structurally more capable and relatively lower cost solution is provided by the TPS of the present invention.

SUMMARY OF THE INVENTION

The present invention provides a multi-layer thermal protection system (TPS) comprising the combination of an oxidation resistant, high temperature capable and relatively high strength carbonaceous foam core with a high specific strength metal matrix composite layer thereon to provide a TPS that reduces the bulk and weight of currently proposed material systems. This novel TPS provides the opportunity to reduce the vehicle size and weight or increase payload capability while equaling or exceeding the performance of prior art or proposed alternative fabrication systems.

DETAILED DESCRIPTION

The thermal protection system (TPS) of the present invention comprises a carbonaceous foam core combined with a high specific strength metal matrix composite and optionally, as described hereinafter, and optionally, protective layer(s), e.g. an anti-oxidant layer over the carbon-base foam core.

Figure 2:
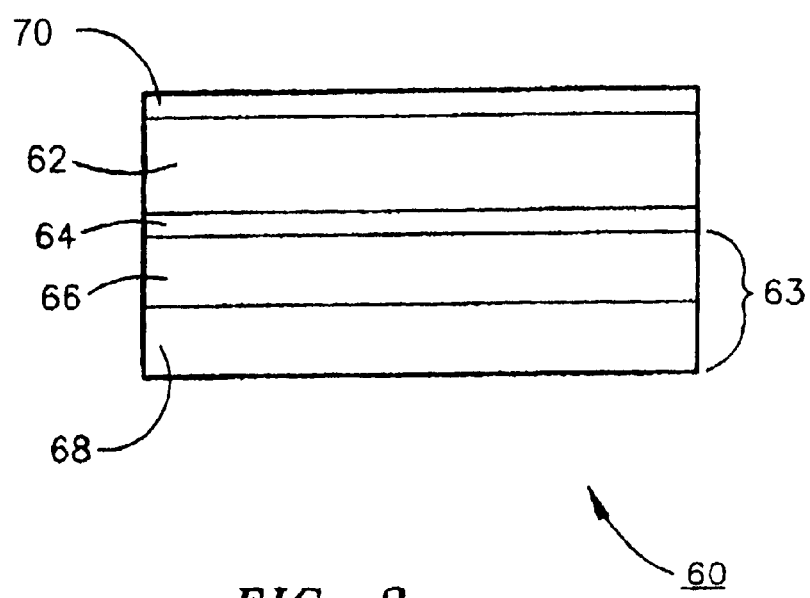
FIG. 2 is a cross-sectional view of the composite thermal protection system of the present invention.

Referring now to FIG. 2, the TPS of the present invention 60 comprises a carbonaceous foam core 62, a metallic intermediate layer 64, and a structural portion 63 comprising alternating brazing layer(s) 66, and high-strength metal matrix composite layer(s) 68. Carbonaceous foam core 62 is preferably overcoated with an anti-oxidant layer 70. While in the description that follows, structural portion 63 is commonly referred to and described as comprising as single pair of layers 66 and 68, it will be apparent to the skilled artisan and is fully intended as within the scope of the present invention that a plurality of alternating layers 66 and 68 providing a single integrated structural portion 63 can and will be used in TPS 60 as described and claimed herein.

U.S. patent application Ser. No. 09/453,729, filed Dec. 12, 1999 entitled "Cellular Coal Products and Processes" and U.S. patent application Ser. No. 09/902,828, filed Jul. 10, 2001 and entitled "Cellular Coal Products and Processes" both owned by a common assignee describe coal-based cellular or porous products having a density of preferably between about 0.1 g/cm$^3$ and about 0.8g/cm$^3$ that are produced by the controlled heating and decomposition of coal particulate preferably up to 1 mm in diameter in a "mold" and under non-oxidizing atmosphere. According to specifically preferred embodiments, the coal-based starting materials exhibit a "free swell index" as determined by ASTM test D720 of between about 3.5 and about 5.0. The porous products produced by these processes, preferably as a net shape or near net shape, can be readily machined using conventional techniques, adhered and otherwise fabricated to produce a wide variety of low cost, low density products, or used in their preformed shape. Such cellular products have been shown to exhibit compressive strengths of up to about 6000psi. It is these carbon materials that form core 62 of TPS 60 shown in FIG. 2 and described herein.

U.S. patent application Ser. No. 09/733,566 filed Dec. 8, 2000 and entitled "Continuous Metal Matrix Composite Consolidation" describes a method for the fabrication of unique large aluminum metal matrix composite (AMC) structures comprising the continuous brazing of aluminum matrix braze-clad tape using an infrared laser to melt the braze clad on the tape while applying pressure to the tape and simultaneously contacting it with previously applied tape layers on a rotating mandrel. The apparatus utilized to accomplish this fabrication process may include a variety of pre and post-contact heaters and preferably includes instruments for the continuous monitoring and control of the process. It is the materials produced in accordance with this process that form the high specific strength metal matrix composite portion, structural portion 63, comprising layers 66 and 68 of TPS 10 of the present invention.

U.S. patent applications Ser. Nos. 09/733,566; 09/453,729 and 09/902,828 filed Jul. 10, 2001 and entitled "Cellular Coal Products and Processes" are all incorporated by reference in their entirety into this specification.

Core 62 of TPS 60 of the present invention comprises coal-based cellular or porous product, i.e. a foam, having a density of preferably between about 0.1 g/cm$^3$ and about 0.8 g/cm$^3$. According to a highly preferred embodiment the foam is produced by the controlled heating of coal particulate preferably up to ¼ inch in diameter in a "mold" and under a non-oxidizing atmosphere. According to a further specifically preferred embodiment, the starting material is a coal having a free swell index as determined by the standard ASTM D720 test of between about 3.5 and about 5.0. Such carbon based foams, without further treatment and/or the addition of strengthening additives exhibit compressive strengths of up to about 4000 psi. Impregnation with appropriate materials or the incorporation of various strength improving additives can further increase the compressive, tensile and other properties of these cellular materials. Although a wide variety of coals meeting the foregoing requirements can be use to produce the carbon foam materials described herein, they are preferably bituminous, agglomerating coals that have been comminuted to an appropriate particle size, preferably to a fine powder below about −60 to −80 mesh.

Figure 5:
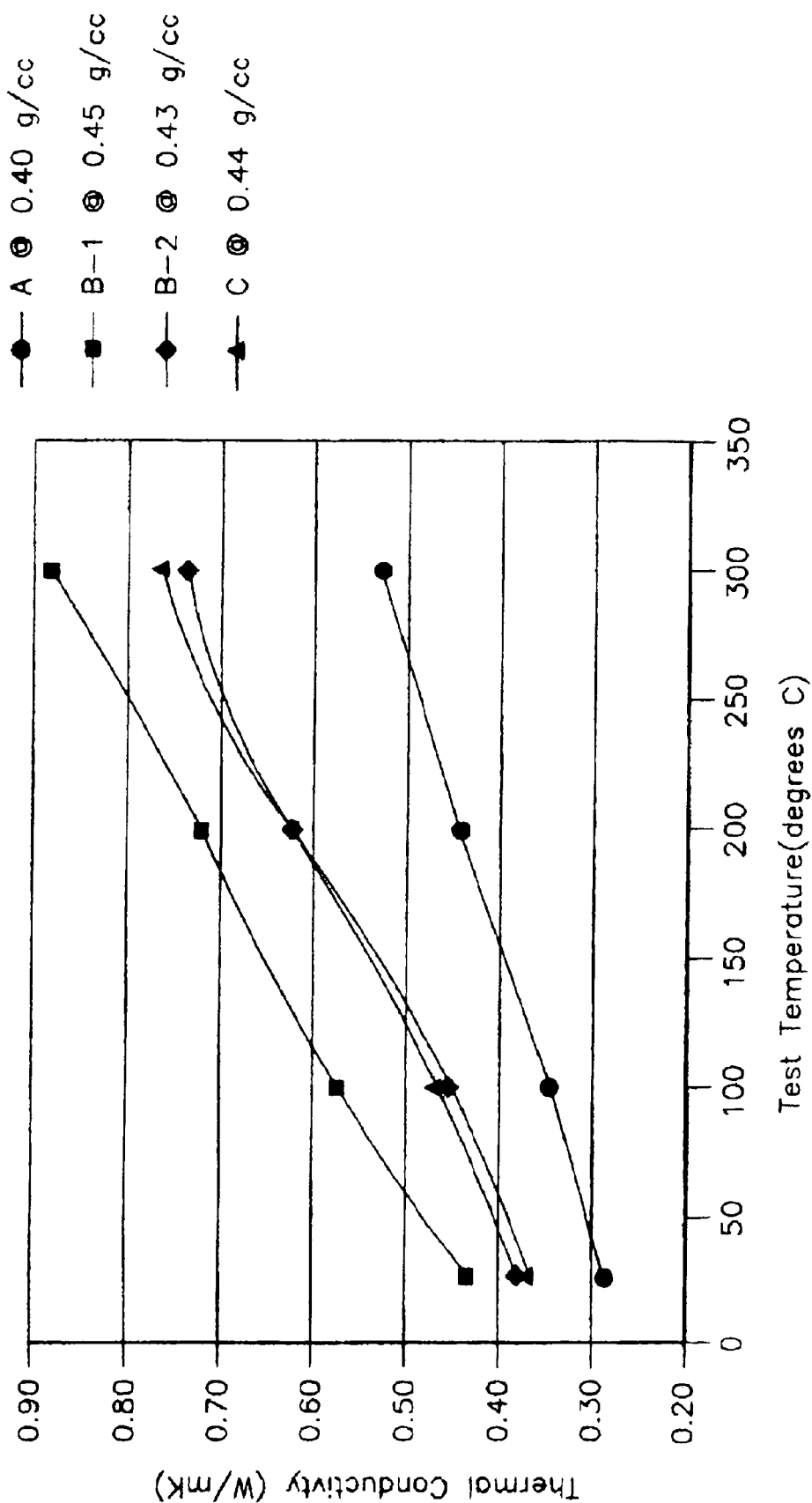
FIG. 5 is a graph of thermal conductivity (W/mK) versus temperature (° C.) for some of the carbon foam materials that form the carbonaceous core of the TPS of the present invention.

The utility of these coal-based carbon foams as insulating materials is clearly shown in FIG. 5 wherein carbon foams in accordance with the present invention having a density of between about 0.40 and 0.45 g/cc exhibit thermal conductivities in the range of 0.3–0.9 at test temperatures of between about 25° C. and 300° C.

The preferred coal-based materials described herein are semi-crystalline or more accurately turbostratically-ordered and largely isotropic i.e., demonstrating physical properties that are approximately equal in all directions. The coal-based products of the present invention typically exhibit pore sizes on the order of less than 300 $\mu$, although pore sizes of up to 500 $\mu$ are possible within the operating parameters of the processes described. The thermal conductivities of the coal-based foams are generally less than about 1.0 W/m/° K. Typically, these cellular coal-based products demonstrate compressive strengths on the order of from about 2000 to about 6000 psi at densities of from about 0.4 to about 0.5 g/cm$^3$ It is most desirable to the successful production of TPS 60 of the present invention from the coal-based foams described herein that the coal starting material exhibit the previously specified free swell index of between about 3.5 and about 5.0 and preferably between about 3.75 and about 4.5. Selection of starting materials within these parameters was determined by evaluating a large number of coals characterized as ranging from high to low volatiles. In general, it has been found that bituminous coals exhibiting free swell indexes within the previously specified ranges provided the best foam products for the production of thermal protection systems in that they exhibit the lowest calcined foam densities and the highest calcined foam specific strengths (compressive strength/density). Coals having free swell indices below these preferred ranges may not agglomerate properly leaving a powder mass or sinter, but not swell or foam, while coals exhibiting free swell indices above these preferred ranges may heave upon foaming and collapsed upon themselves leaving a dense compact.

The preferred coal-based foam production method of the present invention comprises: 1) heating a coal particulate of preferably small i.e., less than about ¼ inch particle size in a "mold" and under a non-oxidizing atmosphere at a heat up rate of from about 1 to about 20° C. to a temperature of between about 300 and about 700° C.; 2) soaking at a temperature of between about 300 and 700° C. for from about 10 minutes up to about 12 hours to form a preform or finished product; and 3) controllably cooling the preform or finished product to a temperature below about 100° C. The non-oxidizing atmosphere may be provided by the introduction of inert or non-oxidizing gas into the "mold" at a pressure of from about 0 psi, i.e., free flowing gas up to about 500 psi. The inert gas used may be any of the commonly used inert or non-oxidizing gases such as nitrogen, helium, argon, $CO_2$, etc.

It is generally not desirable that the reaction chamber be vented or leak during the heating and soaking operation. The pressure of the chamber and the increasing volatile content therein tends to retard further volatilization while the cellular product sinters at the indicated elevated temperatures. If the furnace is vented or leaks during soaking, an insufficient amount of volatile matter may be present to permit inter-particle sintering of the coal particles thus resulting in the formation of a sintered powder as opposed to the desired cellular product. Thus, according to a preferred embodiment of the present process, venting or leakage of non-oxidizing gas and generated volatiles is inhibited consistent with the production of an acceptable cellular product.

Additional more conventional blowing agents may be added to the particulate prior to expansion to enhance or otherwise modify the pore-forming operation.

The term "mold", as used herein is meant to define a mechanism for providing controlled dimensional forming of the expanding coal. Thus, any chamber into which the coal particulate is deposited prior to or during heating and which, upon the coal powder attaining the appropriate expansion temperature, contains and shapes the expanding porous coal to some predetermined configuration such as: a flat sheet; a curved sheet; a shaped object; a building block; a rod; tube or any other desired solid shape can be considered a "mold" for purposes of the instant invention.

Figure 1:
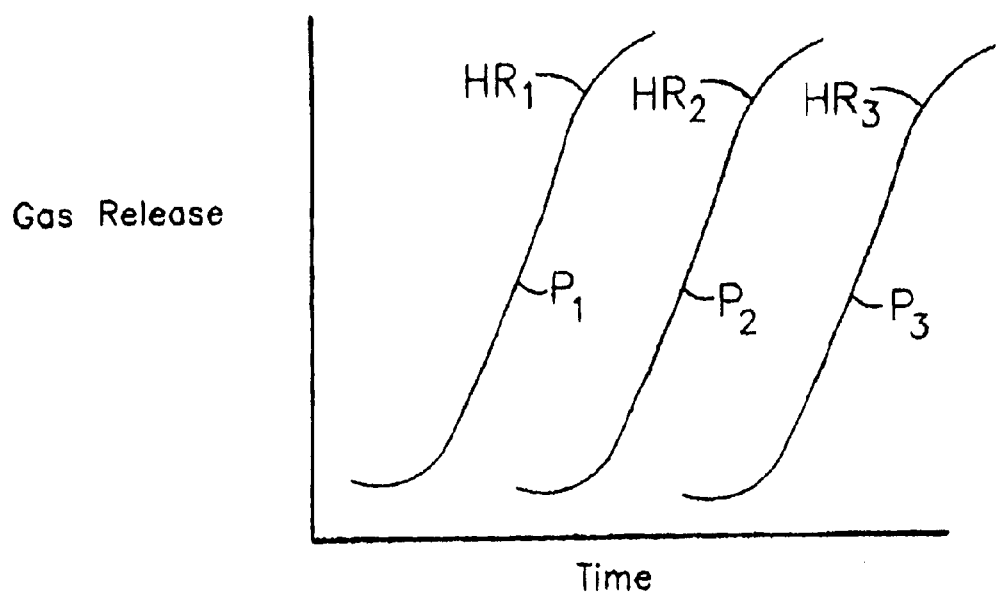
FIG. 1 is a graph of showing the general relationship between gas evolution and time/temperature at various operating pressures and temperatures for the process of the present invention.

As will be apparent to the skilled artisan familiar with pressurized gas release reactions, as the pressure in the reaction vessel, in this case the mold increases, from 0 psi to 500 psi, as imposed by the non-oxidizing gas, the reaction time will increase and the density of the produced porous coal will increase as the size of the "bubbles" or pores produced in the expanded coal decreases. Similarly, a low soak temperature at, for example about 400° C. will result in a larger pore or bubble size and consequently a less dense expanded coal than would be achieved with a soak temperature of about 600° C. Further, the heat-up rate will also affect pore size, a faster heat-up rate resulting in a smaller pore size and consequently a denser expanded coal product than a slow heat-up rate. These phenomenon are, of course, due to the kinetics of the volatile release reactions which are affected, as just described, by the ambient pressure and temperature and the rate at which that temperature is achieved. These process variables can be used to custom produce the expanded coals of the present invention in a wide variety of controlled densities, strengths etc. These results are graphically represented in FIG. 1 wherein the X axis is gas release, the Y axis is time and the individual curves represent different pressures of inert gas $P_1$, $P_2$, and $P_3$, different heat-up rates $HR_1$, $HR_2$, and $HR_3$, and $P_1<P_2<P_3$ and $HR_1<HR_2<HR_3$.

Cooling of the coal-based foam after soaking is not particularly critical except as it may result in cracking of thereof as the result of the development of undesirable thermal stresses. Cooling rates less than 10° C./min to a temperature of about 100° C. are typically used to prevent cracking due to thermal shock. Somewhat higher, but carefully controlled, cooling rates may however, be used to obtain a "sealed skin" on the open cell structure of the product foam as described below. The rate of cooling below 100° C. is in no way critical.

After expanding the coal particulate as just described, the porous coal product is an open celled material. Several techniques have been developed for "sealing" the surface of the open celled structure to improve its adhesive or joining capabilities, for example, for the application of facesheets or protective antioxidant layers of dissimilar materials, for further fabrication and assembly of a number of parts or for formation of TPS 60 described herein through the attachment of additional layers 64 and 70. For example, a layer of a commercially available graphitic-epoxy or graphitic-phenolic adhesive can be coated onto the surface and cured at elevated temperature or allowed to cure at room temperature to provide an adherent skin for attachment of layers 64 and 70. Alternatively, the expansion operation can be modified by cooling the expanded coal product or preform rapidly, e.g., at a rate of 10° C./min or faster after expansion. It has been discovered that this process modification results in the formation of a more dense skin on the preform or product which presents a closed pore surface to the outside of the preform or product. At these cooling rates, care must be exercised to avoid cracking of the preform or product.

After expanding, the porous coal-based preform or product is readily machineable, sawable and otherwise readily fabricated using conventional fabrication techniques to fabricate the composite tooling described herein.

Subsequent to production of the preform or product as just described, the preform or product may be, and in the current application as core 62 of TPS 60 preferably is subjected to carbonization and/or graphitization according to conventional processes to obtain particular properties desirable for specific applications, for example, to render the carbon foam more heat or ablation resistant as will be desirable in many TPS applications.

Additionally, a variety of additives and structural reinforcers may be added to the coal-based preforms or products either before or after expansion to enhance specific mechanical properties such as fracture strain, fracture toughness and impact resistance should these be required for a particular TPS application. For example, particles, whiskers, fibers, plates, etc. of appropriate carbonaceous or ceramic composition can be incorporated into the porous coal-based preform or product to enhance its mechanical properties.

The open celled, coal-based foams of the present invention can additionally be impregnated with, for example, petroleum pitch, epoxy resins or other polymers using a vacuum assisted resin transfer type of process. The incorporation of such additives provides load transfer advantages similar to those demonstrated in carbon composite materials. In effect a 3-D composite is produced that demonstrates enhanced impact resistance and load transfer properties should these be required by a particular TPS application.

The cooling step in the expansion process results in some relatively minimal shrinkage on the order of less than about 5% and generally in the range of from about 2% to about 3%. This shrinkage must be accounted for in the production of near net shape preforms or final products of specific dimensions and is readily determinable through trial and error with the particular coal starting material being used. The shrinkage may be further minimized by the addition of some inert solid material such as coke particles, ceramic particles, ground waste from the coal expansion process etc. as is common practice in ceramic fabrication so long as such additions do not adversely affect the thermal conductivity or elevated temperature performance of the foam as intended for its end use.

Carbonization, sometimes referred to as calcining, is conventionally performed by heating the preform or product foam under an appropriate inert gas at a heat-up rate of less than about 5° C. per minute to a temperature of between about 800° C. and about 1200° C. and soaking for from about 1 hour to about three or more hours. Appropriate inert gases are those described above that are tolerant of these high temperatures. The inert atmosphere is supplied at a pressure of from about 0 psi up to a few atmospheres. The carbonization/calcination process serves to remove all of the non-carbon elements present in the preform or product such as sulfur, oxygen, hydrogen, etc that might adversely affect TPS 60 in its application.

Graphitization, commonly involves heating the preform or product either before or after carbonization at a heat-up rate of less than about 10° C. per minute, preferably from about 1° C. to about 5° C. per minute, to a temperature of between about 1700° C. and about 3000° C. in an atmosphere of helium or argon and soaking for a period of less than about one hour. Again, the inert gas may be supplied at a pressure ranging from about 0 psi up to a few atmospheres. Graphitization as just described, results in the formation of a cabonaceous core 62 that is extremely heat resistant and free of volatiles that could reduce its utility in high temperature insulating applications.

The preferred, coal-based porous TPS core 12 preforms and products of the present invention can be produced in any solid geometric shape. Such production is possible using any number of modified conventional processing techniques such as extrusion, injection molding, etc. In each of such instances, the process must, of course, be modified to accommodate the processing characteristics of the starting material coal. For example, in extruding such products, as described below, the coal powder starting material is fed by an auger into an expansion chamber where it is expanded and from which it is extruded while still viscous. Upon exiting the extrusion die, the material is cooled to provide a solid shape of the desired and precalculated dimensions. To improve the efficiency, i.e., cycle time of the process, the input material can be preheated to a temperature below the expansion point, e.g., below about 300° C., fed into the auger chamber where additional heat is imparted to the powder with final heating being achieved just before extrusion through the die.

Similar relatively minor process modifications can be envisioned to fabricate carbon foam cores 62 in injection molding, casting and other similar conventional material fabrication processes.

Additional details and examples of the fabrication process of carbonaceous core 62 are contained in aforementioned U.S. patent application Ser. No. 09/453,729, filed Dec. 12, 1999 and entitled "Cellular Coal Products and Processes" which is incorporated herein in its entirety.

As mentioned above, the carbonaceous foam cores 62 of the present invention may be coated with a wide variety of protective layers 70 such as antioxidant layers. Such protective layers 70 which act as oxidation preventive barriers include, for example, but not exclusively, thermal spray, plasma spray or laser deposition processes of applied coatings of a metal, for example, aluminum or inconel etc. to achieve specific heat resistant, ablation resistant, heat transfer or thermal expansion properties compatible with the specific end use requirements for TPS 60. As will be described below, it is the application of metals in this fashion that permits the joining of layers 66 and 68 to foam core 62 to provide TPS 60 described herein. Additionally, other similar systems that achieve the same antioxidant results include those based upon glass forming metal-halide, carbide or nitride compounds that can be applied onto the foam by vapor or mechanical deposition. Examples of such materials include, but are not limited to $ZrB_2$, SiC, and $B_4C$. When exposed to oxidizing conditions at elevated temperatures, these compounds form protective glass-like films such as $ZrO_2$, $SiO_2$ and $B_2O_3$. Such layers can also be adhered to the carbonaceous foam core using any of a wide variety of, for example, graphite-epoxy, or graphite-phenolic adhesives available commercially, if the final end-use application of TPS 60 will such adhesives without resulting in their decomposition or volatilization in high temperature applications. Alternatively, various spray deposition techniques are commercially available for the application of such layers to cabonaceous foam core 62.

Whatever the antioxidant material applied as layer 70 over foam core 62, since many of these materials are relatively brittle, it is important to the successful practice of the present invention in its most demanding applications, that the termal expansion of any protective layer 62 be matched to the thermal expansion of underlying foam core 62, or perhaps more properly, the thermal expansion of foam core 62 be matched to that of antioxidant protective layer 70, as this may indeed be the simpler approach given the relative capability of foam core 62 to be tailored in its thermal expansion properties.

According to an alternative preferred embodiment, the antioxidant property can be imparted directly to the carbon foam through the incorporation of appropriate oxidation inhibitors directly into the carbon foam, either with or without the additional protection afforded by the presence of a separate protective antioxidant layer 70. Appropriate oxidation inhibitors usable in this context include those described above in connection with the application of protective antioxidant layers.

As a further enhancement of the properties of foam core 62 described herein, functionally graded foams of varying density at their surfaces or throughout their structure may be prepared as described in copending U.S. patent application Ser. No. 09/733,602, filed Dec. 8, 2000. According to this invention, coal-based cellular products having integral stiffeners or load paths, directed heat transfer paths and directed mass transfer paths are provided through the placement of coal-based cells of a different size and/or density than those making up the matrix of the product during manufacture. There is also provided a method for the production of coal-based cellular products possessing these characteristics. The method described in this application utilizes the ability to select and design such properties through the proper selection and control of cell size and density. Such control of cell size and density is in turn achieved through appropriate selection of starting materials, starting material particle size, mold packing and processing parameters. This application is incorporated herein in its entirety.

In TPS 60 of the present invention, the foregoing carbon foam thermally insulating/structural member 62 is married to or combined with a continuously brazed aluminum metal-matrix composite. In fabrication, the above-described carbon foam material that forms layer 62 is plasma sprayed or otherwise (thermally, laser, vapor deposition) coated with a layer of aluminum 64, and then brazed onto a continuously-wound or otherwise applied and brazed aluminum matrix structure (AMC), e.g. tubes or tank sections, as described in aforementioned U.S. patent application Ser. No. 09/902,828, filed Jul. 10, 2001, and entitled "Continuous Metal Matrix Composite Consolidation."

Layer 68 of TPS 10 is a metal matrix composite (MMC), specifically preferred is an aluminum matrix composite (AMC), in prepeg tape form comprised of alumina ($Al_2O_3$), or other suitable ceramic fibers, in an aluminum/ aluminum alloy matrix. The prepeg tape is coated with a "brazing" alloy, layer 66 of an aluminum alloy having a lower melting point than the aluminum matrix of the prepeg tape/ composite, prior to application in the process of the present invention. Fabrication is accomplished by applying the braze material coated prepeg tape comprising layers 66 and 68 to a fabrication structure with the simultaneous application of pressure while melting the braze coating at the junction between the prepeg tape and the material interface (layer 14) surface using a laser, preferably an infrared or diode laser that provides very limited and very localized heating and melting of the braze coat. The laser beam of infrared radiation preferably has a rectangular cross section to enhance heating efficiency in the area of the junction. As will be seen from the detailed description that follows, a variety of pre and post-contact heaters and process control devices are preferably used to control and monitor the process. The braze-coated feedstock just described and comprising layers 66 and 68 can be prefabricated at a remote location and provided in coil form, or, as described hereinafter, can be prepared just prior to fabrication by coating the AMC prepeg, layer 68, with the braze coat, layer 66 in line just prior to exposure to the laser radiation and application to the fabrication structure.

While any number of techniques such as spraying (thermal, arc, plasma, etc.), surface alloying, etc. can be used to apply the lower melting braze coating to the prepeg tape, in the case where the braze coating is applied in line with the consolidation operation, the prepeg tape is guided through a pot of molten brazing, i.e. lower melting, metal, extracted from the pot of metal through a coating thickness control device such as a die or air knife, and then through a cooling chamber to solidify the coating. Preferably, the pot of molten metal is equipped with an ultrasonic pulse inducing element comprising a power supply, a transducer and a probe to facilitate coating of the matrix of the prepeg tape with the braze coating. When used, the ultrasonic probe is inserted into the pot of lower melting molten metal it produces a cavitation field that results in pressure waves that reduce the contact angle and improve the wetting of the lower melting material to the prepeg. The cooling chamber can be highly sophisticated, but can be as simple a metal tube through which is flowed a chilled gas such as nitrogen and through which the braze coated prepeg travels on exit from the coating pot and the thickness control device.

Figure 3:
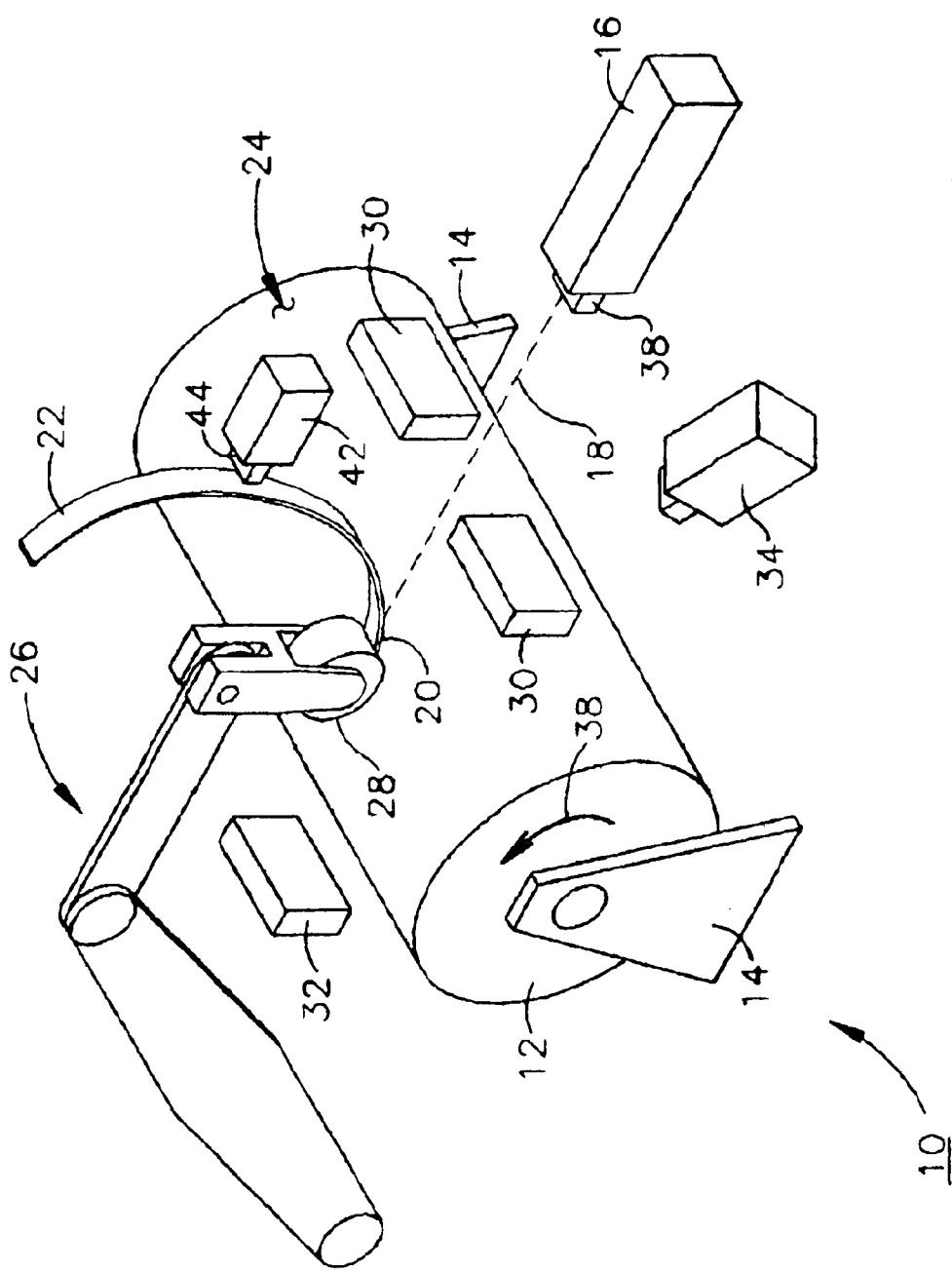
FIG. 3 is a schema tic perspective view of apparatus suitable for the manufacture of AMC structures in accordance with the process of the present invention.

Referring now to FIG. 3 that depicts one preferred method for the application of the process described in aforementioned U.S. Patent Application entitled "Continuous Metal Matrix Consolidation", consolidation apparatus 10 comprises a rotating mandrel 12 supported on legs 14 (or any other suitable support system), a laser 16 that directs a beam of infrared radiation 18 to the junction 20 between braze coated prepeg tape 22 and surface 24, a carriage unit 26 that supports and imparts lateral traversing motion to compaction wheel 28, pre-heaters 30 and post heater(s) 32. According to a preferred embodiment of the invention, an optical pyrometer 33 can be used to monitor the temperature at junction 20 and the signal therefrom used to control either the mandrel rotation an/or carriage unit traverse speeds or the intensity of laser 16, to thereby control the temperature of the molten braze coating 36 (see FIG. 4) that occurs at junction 20.

Figure 4:
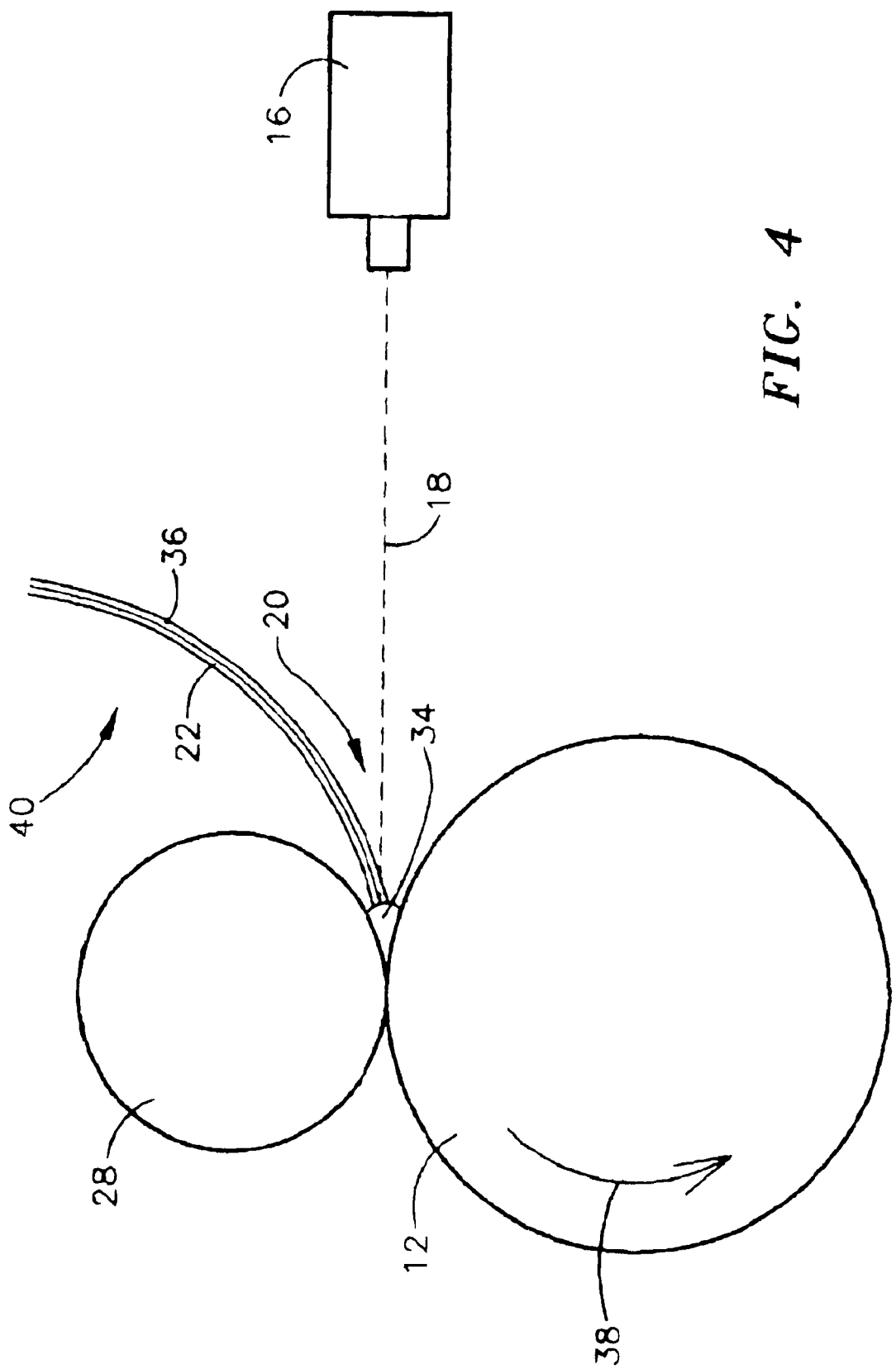
FIG. 4 is a schematic depiction of the area of contact between the mandrel surface, and the incoming prepeg tape at the point of application of infrared laser radiation in accordance with the process of the present invention.

Referring now to FIG. 4 that schematically depicts a side view of consolidation apparatus 10 and shows the relative positions of laser 16, infrared radiation beam 18, compaction wheel 28, mandrel 12 that in the case of the instant invention may comprise a structure of carbonaceous core 62, and incoming braze-coated prepeg tape 22 at junction 20, it is readily observed that at junction 20, there exists a "front" of molten metal 34 that comprises the molten or liquid form of braze coating 36 on prepeg tape 22. Front 34 is produced by the localized heating induced by the impact of infrared radiation beam 18 upon the surface of braze coating 36. It must be noted, that although not specifically depicted in FIG. 4, surface 24 of mandrel 12 (carbonaceous core 62) includes at least one wrap of previously applied prepeg tape 22, or, as in the case of the instant application, a previously applied layer of metal/aluminum 64 to which incoming feedstock prepeg tape 22 is adhered as braze coating 36 melts due to the localized and controlled heating action of infrared radiation beam 18, and subsequently cools as it is removed from the area of front 34 due to rotation of mandrel 12 in the direction shown by arrow 38 thereby building serial overlying layers of AMC joined to each other by alternating layers of braze material 36. Simultaneously with the creation of front 34 and the movement of prepeg tape 22 in the direction indicated by arrow 38, compaction wheel 28 pushes prepeg tape 22, and consequently associated melted braze coating 36, into intimate contact with surface 24 on mandrel 12 causing prepeg tape 22 to adhere firmly thereto. The specific conditions under which such fabrication can occur are described in greater detail hereinafter. Conversion of this fabrication process and apparatus to one that involves the continuos fabrication of TPS 60 of the present invention in "sheet" or other structural shape by the simultaneous application of pressure and melting force as applied by a suitable laser is clearly within the capabilities of those skilled in the art given the description contained herein.

Consolidation apparatus 10 fundamentally comprises a 2-axis filament winder of the type used in the fabrication of polymer matrix composites. According to a preferred embodiment, mandrel 12 can be up to 48 inches long and up to about 36 inches in diameter. Of course, larger dimensioned devices can be used in those cases where larger structural members are being fabricated. The rotational movement of mandrel 12 and the linear traverse of compaction wheel 28 on carriage unit 26 are controlled and coordinated by means of "Pattern Master" software or the like that are supplied with the filament winder unit, or custom deigned and implemented if a specific non-standard wrap pattern is required or desired.

Laser 16 preferably comprises a stacked multi-bar infrared laser. An array of optical lenses 38 are used to shape infrared radiation beam 18 into a rectangular pattern that matches the cross-sectional dimension of prepeg tape 22. According to a preferred embodiment of the invention, laser 16 is powered by a DC power supply capable of delivering 75 amps to the preferred stacked multi-bar diode laser 16. Laser 16 in this configuration is designed to operate in a continuous wave mode at a power of up to 500 watts. Water cooling of the laser head is required to maintain the life of the diodes and is conventionally accomplished by means of a water-to-air chiller unit (not shown). Multi-bar diode lasers of this type are commercially available from Opto Power Corporation, 3321 E. Global Loop, Tucson, Ariz. 85706.

Mandrel 12 may, of course be collapsible or otherwise removable once the finished structure is completed by completion of the wrapping operation in the case of the production of a tubular structure as described herein, but may simply comprise a suitable shape of carbonaceous core 62 in the case where a "flat" or otherwise suitably configured structural shape of carbonaceous core 62 is being "laminated" with prepeg tape 22 as described herein.

As shown in FIG. 3, immediately after junction 20 prepeg tape 22 is contacted on its reverse side 40 by compacting wheel 28 to accomplish consolidation. Compacting wheel is preferably fabricated from a ceramic material to minimize conductive heat loss from junction 20 during consolidation. A highly preferred material for compaction wheel 28 is zirconium phosphate which exhibits these and other suitable properties. Of course, suitable alternative process controls can make the selection of materials for compaction wheel 28 less critical. Compaction wheel 28 is arranged to ride at top dead center of mandrel 12 or in whatever fashion may be appropriate when an alternative shape is being "laminated" and is guided in its movement by carriage assembly 26. Compaction wheel 28 in addition to providing compressive energy for consolidation also has a second important function, in that it provides a V-shaped cavity at junction 20 thereby reducing reflective losses by trapping some of the infrared radiation of beam 18 and creating a "multiple bounce" situation where most of the incoming radiation is used for heating and less of such radiation is lost due to reflection from the various surfaces at junction 20.

Preheat lamps 30, and where used post heat lamp(s) 32 preferably comprise reflector lamps as line sources of infrared energy to preheat or post heat prepeg tape 22 prior to or after exit from junction 20. Preheat lamps 30 preferably heat prepeg tape 22 to a temperature of about 500° F. in order to reduce the heating load on laser 16. As will be obvious to the skilled artisan, such preheating may not be required if a higher powered laser is used. Post heating lamp(s) 32 are similarly configured, and if and where applied can be used to control the cool down of prepeg tape 22 as it exits junction 20 to reduce the thermal stresses that may be induced by the brazing process.

According to an alternative preferred embodiment of the present invention, a rotary ball vibrator 42 that induces vibration in the range of from about 1000 to about 25000 vibrations per minute is added to consolidation apparatus 10 to provide a more thorough mixing of molten braze alloy front 34 at junction 20. Rotary ball vibrator 42 is attached to a metal rod 44 that contacts prepeg tape 22 just before it enters junction 20. The presence of rotary ball vibrator 42 causes prepeg tape 22 to vibrate at the same frequency as vibrator 42 which in turn induces oscillations in front 34 at junction 20. Thus, these oscillations occur in junction 20 as prepeg tape 22 is addressed by compaction wheel 28.

According to yet another alternative preferred embodiment of the present invention, a flow of inert gas is applied over the heated area at junction 20 to minimize the formation of oxides in front 34 during brazing. Free flowing argon, nitrogen or the like inert gas directed to the area of junction 20 appears to provide such benefit.

Optical pyrometer 33 may be included to provide temperature feedback information to the control circuits of laser 16 thereby assuring that the appropriate amount of heat is being applied at junction 20 to achieve satisfactory melting of braze coating 36 and consolidation as described above.

Finally, at least in process development and refinement situations, it can be desirable to include a video camera (not shown) to closely monitor the area of junction 20 to obtain the appropriate operating parameters for a specific given prepeg tape 22 and braze coating 34 composition.

In practice, the method of the present invention is carried out using the above-described apparatus 10 by first applying a suitable aluminum alloy coating 14 on the surface of carbonaceous core 62, for example, pure aluminum, 1100 alloy aluminum or any other suitable aluminum, titanium, magnesium etc. metallic matrix containing a ceramic reinforcing material, for example, Nextel 610™ aluminum oxide 1500 denier fibers commercially available from the 3M Corporation, Minneapolis, Minn. Prepeg tape 22 is preferably provided as a coil on a payoff for continuous feeding. Consolidation apparatus 10 is then activated. Mandrel 12 begins to turn, or in the case of application to a flat or otherwise shaped surface oscillated in a direction orthogonal to the width of compacting wheel 28, the laser 16 is focused on junction 20 and prepeg 22 is fed into junction 20 for consolidation by compacting wheel 28. The specific process conditions are largely a matter of choice as dictated by the materials being consolidated (the AMC matrix 68 alloy and the braze coating 66 compositions), the power of laser 16, the rotational or movement speed of mandrel/surface 12 etc. However, in the case of fabrication of the above-described prepeg tape bearing braze coatings of the types referred to in the examples below, melting temperatures in the range of from about 375 to about 1200° F. produced by a suitable laser operating at between about 100 and about 450 watts and prepeg tape feed rates on the order of between about 0.65 and 1.50 inches/sec. have been found useful and appropriate.

EXAMPLES

The following examples when considered in conjunction with the foregoing detailed description will serve to better illustrate the successful practice of the present invention.

Examples 1–4

Prepeg tapes comprising Nextel 610™ fibers in pure aluminum are consolidated as described hereinabove on a mandrel shape or carbonaceous core 62 coated with a layer 64 of 1100 aluminum alloy applied by thermal spray using the following braze coatings and under the following tabularly presented operating conditions:

| Braze Coating | Braze Temperature | Laser Power | Tape Feed Rate |
|---|---|---|---|
| 1) 96.5 Sn/3.5 Ag | 430–500° F. | 426 Watts | 0.70 inches/sec. |
| 2) 70 Sn/30 Zn | 389–707° F. | 110 Watts | 1.06 inches/sec. |
| 3) 84 Zn/11 Al/5 Cu | 715–845° F. | 268 Watts | 0.87 inches/sec. |
| 4) 88 Al/12 Si | 1070–1220° F. | 373 Watts | 1.27 inches/sec. |

Under each of the foregoing conditions, satisfactory consolidated round structural shapes of the prepeg material indicated were fabricated.

As the invention has been described, it will be apparent to the skilled artisan that the same may be varied in many ways without departing from the spirit and scope of the invention. Any and all such modifications are intended to be included within the scope of the appended claims.

What is claimed is:

1. A thermal protection system, comprising:
   a carbonaceous core having a first and a second surface;
   a layer of aluminum or an alloy of aluminum coated upon said at least said first surface; and
   a structural portion coated over said layer of aluminum or an aluminum alloy comprising at least one pair of alternating layers of:
      an aluminum brazing alloy; and
      an aluminum metal matrix composite.

2. The thermal protection system of claim 1 wherein said layer of aluminum or an aluminum alloy is coated upon said first surface.

3. The thermal protection system of claim 2 wherein said carbonaceous core comprises a semi-crystalline, largely isotropic, porous coal-based product produced from particulate coal exhibiting a free swell index of between about 3.5 and about 5.0, having a density of between about 0.1 and about 0.8 g/cm$^3$ and a thermal conductivity below about 1 W/m/° K.

4. The thermal protection system of claim 3 wherein said coal exhibits a free swell index of between about 3.75 and about 4.5.

5. The thermal protection system of claim 2 wherein said carbonaceous core has a compressive strength below about 6000 psi.

6. The thermal protection system of claim 2 wherein said carbonaceous core has been carbonized.

7. The thermal protection system of claim 2 wherein said carbonaceous core has been graphitized.

8. The thermal protection system of claim 2 further including a protective anti oxidant layer coated on said second surface.

9. The thermal protection system of claim 7 wherein said protective antioxidant layer comprises a member selected from the group consisting of metallic layers, and glass forming metal-halide, carbide or nitride compounds.

10. The thermal protection system of claim 7 wherein said protective antioxidant layer comprises a member selected from the group consisting of $ZrB_2$, $SiC$, and $B_4C$.

11. The thermal protection system of claim 7 wherein said carbonaceous core comprises a semi-crystalline, largely isotropic, porous coal-based product produced from particulate coal exhibiting a free swell index of between about 3.5 and about 5.0, having a density of between about 0.1 and about 0.8 g/cm$^3$ and a thermal conductivity below about 1-W/m/° K.

12. The thermal protection system of claim 10 wherein said coal exhibits a free swell index of between about 3.75 and about 4.5.

13. The thermal protection system of claim 7 wherein said carbonaceous core has a compressive strength below about 6000 psi.

14. The thermal protection system of claim 7 wherein said carbonaceous core has been carbonized.

15. The thermal protection system of claim 7 wherein said carbonaceous core has been graphitized.

16. The thermal protection system of claim 2 further including an anti oxidant blended into said carbonaceous core.

17. The thermal protection system of claim 13 wherein said anti oxidant comprises a member selected from the group consisting of glass forming metal-halide, carbide or nitride compounds.

18. The thermal protection system of claim 14 wherein said protective antioxidant layer comprises a member selected from the group consisting of $ZrB_2$, SiC, and $B_4C$.

19. A thermal protection system, comprising:
a carbon foam core having a first surface; and
a metal matrix composite layer on said first surface of the carbon foam core.

20. The thermal protection system of claim 19, wherein said carbon foam core is a coal-based cellular foam.

21. The thermal protection system of claim 19, wherein said metal matrix composite layer is an aluminum matrix composite comprising ceramic fibers in an aluminum or aluminum alloy matrix.

22. The thermal protection system of claim 21, wherein the ceramic fibers are alumina fibers.

23. The thermal protection system of claim 19, wherein the carbon foam core has a density ranging from about 0.1 to about 0.8 $g/cm^3$ and a thermal conductivity below about 1 W/m/K.

24. The thermal protection system of claim 19, further comprising a protective layer on a second surface of the carbon foam core.

25. The thermal protection system of claim 24, wherein the protective layer is an anti-oxidant protective layer.

26. The thermal protection system of claim 24, wherein the protective layer is a metallic layer.

27. The thermal protection system of claim 24, wherein the protective layer comprises a glass forming metal-halide, carbide, or nitride compound.

* * * * *

UNITED STATES PATENT AND TRADEMARK OFFICE
CERTIFICATE OF CORRECTION

PATENT NO. : 6,689,470 B1
DATED : February 10, 2004
INVENTOR(S) : Brian E. Joseph It is certified that error appears in the above-identified patent and that said Letters Patent is hereby corrected as shown below:

Column 12,
Lines 36 and 41, change "claim 7" to -- claim 8 --.
Line 51, change "claim 10" to -- claim 11 --.
Lines 57 and 59, change "claim 7" to -- claim 11 --.
Line 64, change "claim 13" to -- claim 16 --.

Column 13,
Line 1, change "claim 14" to -- claim 16 --.

Signed and Sealed this

Fourth Day of April, 2006

JON W. DUDAS
*Director of the United States Patent and Trademark Office*